May 11, 1926. 1,584,622
H. N. LOWENTHAL
FEEDING MECHANISM FOR CRUSHERS
Filed August 17, 1921   3 Sheets-Sheet 3
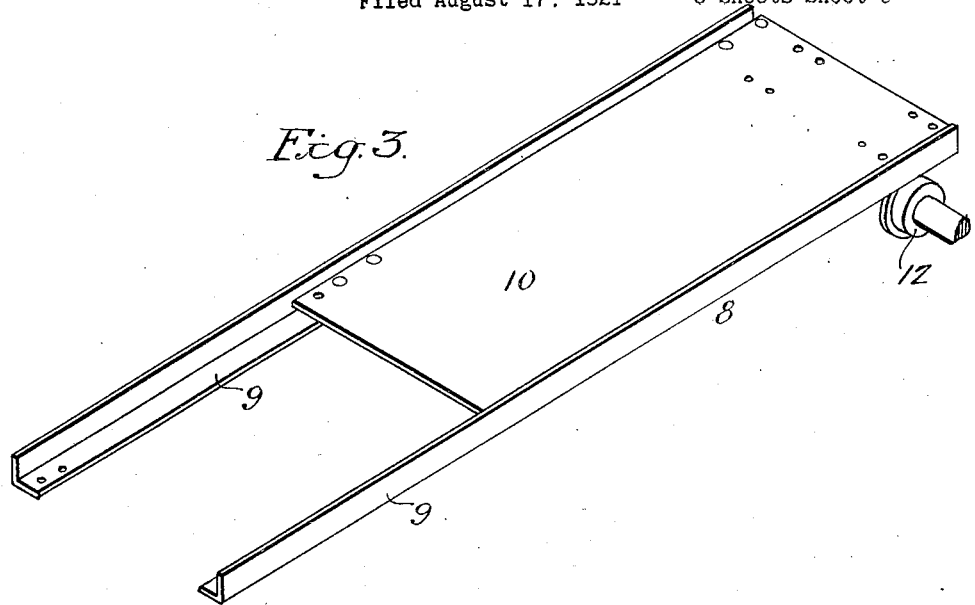
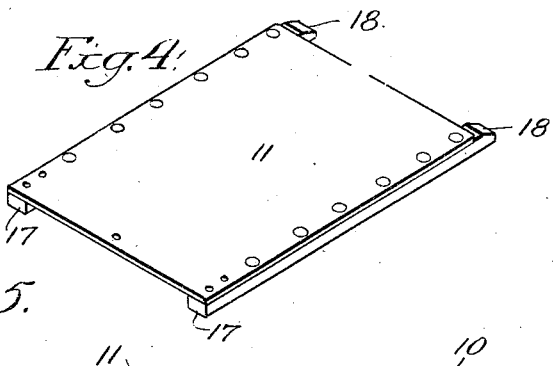
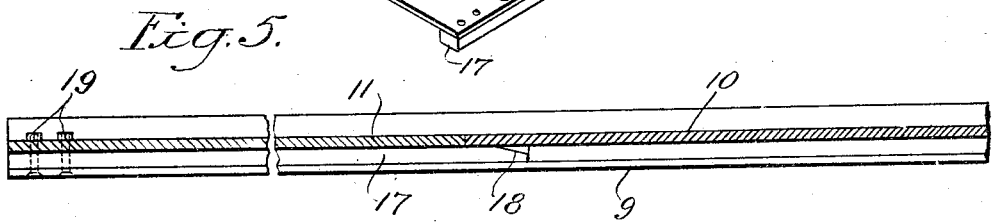
Inventor,
Harry N. Lowenthal,
by his Attorneys,
Howson & Howson Patented May 11, 1926.

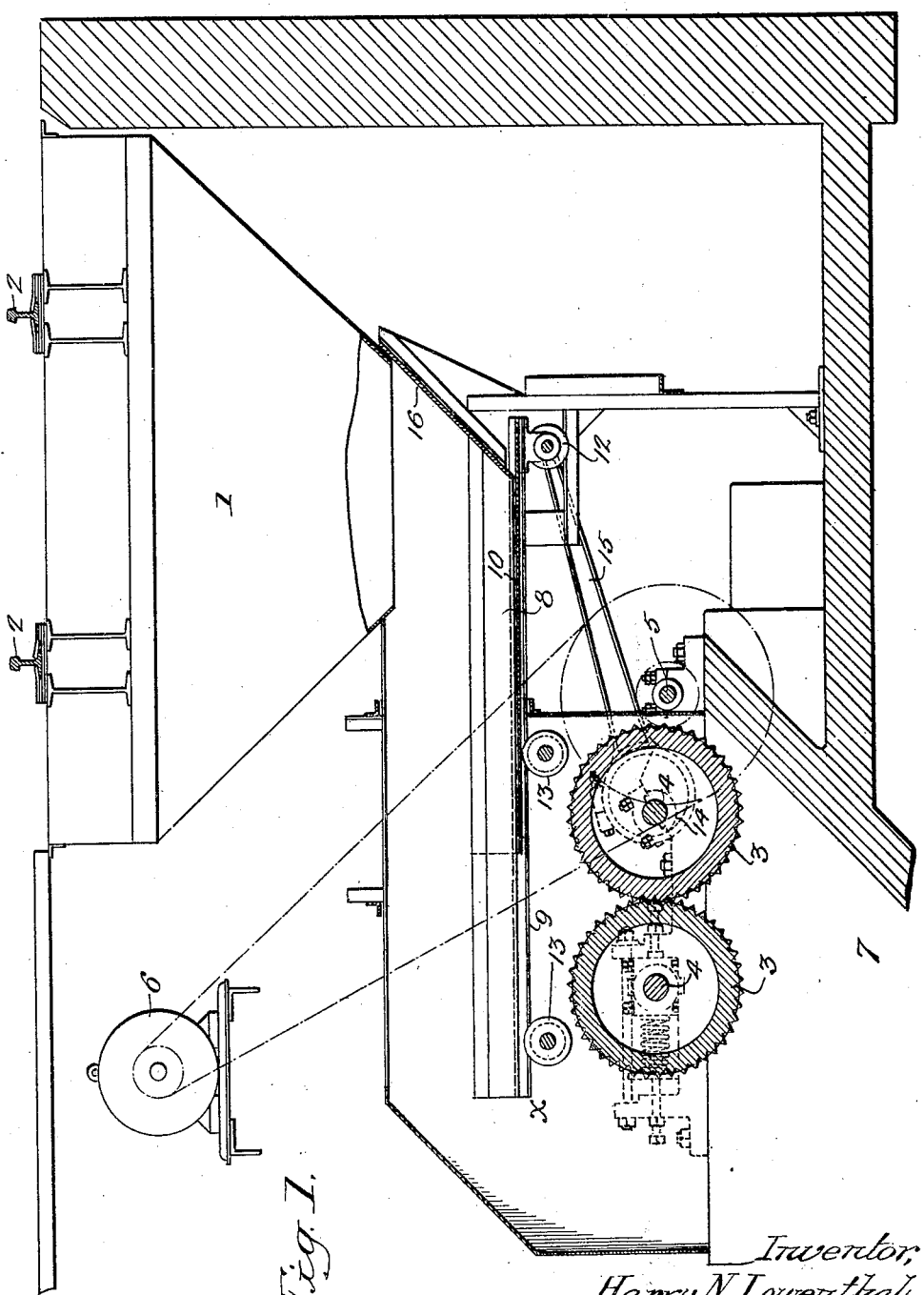

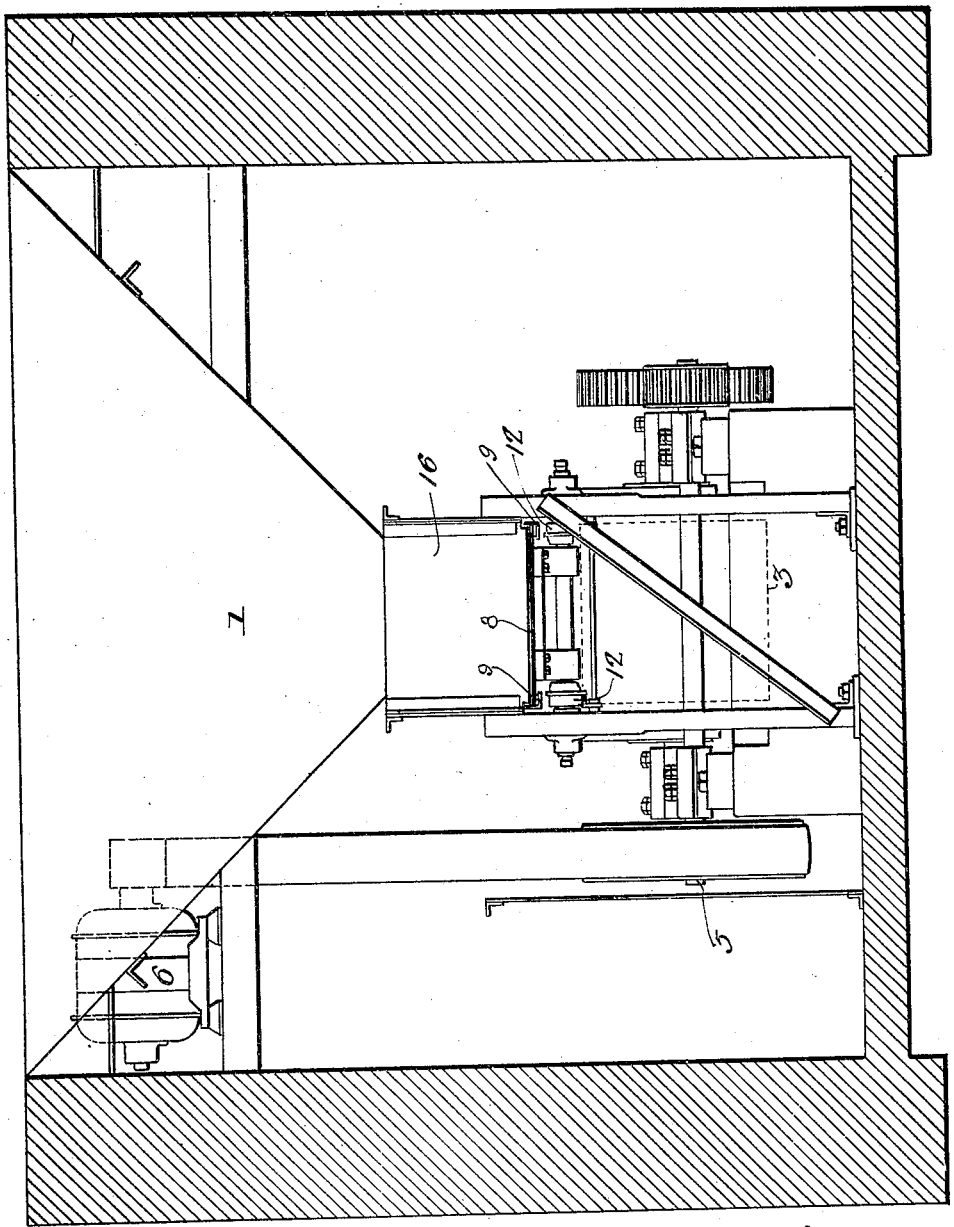

1,584,622

UNITED STATES PATENT OFFICE.

HARRY N. LOWENTHAL, OF PHILADELPHIA, PENNSYLVANIA, ASSIGNOR TO R. H. BEAUMONT COMPANY, OF PHILADELPHIA, PENNSYLVANIA, A CORPORATION OF PENNSYLVANIA.

FEEDING MECHANISM FOR CRUSHERS.

Application filed August 17, 1921. Serial No. 492,944.

My invention relates to certain improvements in apparatus for feeding material from a hopper through crushing rolls to a bin, or other receptacle.

The object of my invention is to provide means for by-passing the crushing rolls, or other crushing devices, when it is not necessary to crush the material as it flows from the hopper to the bin.

This object I attain in the following manner, reference being had to the accompanying drawings, in which:

Fig. 1 is a sectional elevation illustrating my invention;

Fig. 2 is a sectional view through the bin structure and illustrating an end view of the feeding mechanism and rollers;

Fig. 3 is a detached perspective view of the feeder plate;

Fig. 4 is a detached perspective view of the detachable extension for the feeder plate; and Fig. 5 is a view showing a feeder plate with the extension thereon.

Referring to the drawings, 1 is the hopper, which, in the present instance, is directly under the tracks 2 and into which coal, or other material to be crushed, is discharged from cars on the tracks. 3 are the two crushing rolls mounted on shafts 4 driven from a shaft 5, in the present instance, which is belted to a motor 6, or other power device. 7 is a bin, or other receptacle, into which the material flows after passing between the crushing rolls 3.

8 is a feeder plate shown in detail in Fig. 3, having angle plates 9 forming sides and a bottom plate 10 riveted to the sides. The angle plates extend beyond the end of the plate 10 so as to support a supplemental plate 11, which is used when it is desired to by-pass the rolls. The feeder plate 8 has rollers 12 at the rear end and is supported by rollers 13 in fixed bearings at the forward end. The plate is reciprocated by an eccentric 14 connected to the plate by an eccentric rod 15, shown clearly in Fig. 1.

Directly under the hopper 1 at the rear of the device is an inclined plate 16 for directing material onto the feeder plate. As the feeder plate is reciprocated, the material is fed forward and is discharged from the end of the bottom plate 10 of the feeder into the space between the rolls and is crushed by the rolls. After it passes from the rolls, it flows into the bin, or other receptacle, 7.

It is not necessary to crush coal and other material for some purposes and, therefore, it is desirable to provide means for by-passing the crushing rolls. This is accomplished by securing to the end of the feeder plate, the plate 11, shown in Fig. 4. This plate has side members 17, which rest upon the extensions of the angle bars 9 of the feeder plate. The inner ends of these members are beveled, as at 18, so as to fit under the end of the plate 10, being secured to the feeder plate by bolts 19, Fig. 5. When the plate 11 is in position, the material is fed over the crushing rolls and is discharged from the end of the feeder plate at $x$, Fig. 1, flowing directly into the bin, or other receptacle. By this means, the crushing rolls are by-passed without dismantling the rolls or disconnecting them from the driving mechanism.

I claim:

1. The combination in feeding mechanism for crushers, of a reciprocating feeder; means for reciprocating the feeder, said feeder having side bars and a bottom plate attached to the side bars, the side bars extending beyond the bottom plate at one end; means for supporting the bars; and a plate, removably secured to said side bars, forming an extension of the bottom plate.

2. The combination in feeding mechanism for crushers, of a reciprocating feeder, consisting of angular side bars and a bottom plate secured thereto, said bars extending beyond the plate; rollers at the rear of the feeder; rails supporting the rollers; fixed rollers supporting the side bars of the feeder; and a detachable plate secured to the bars beyond the bottom plate and forming, when in place, a continuation of the bottom plate.

3. The combination in feeding mechanism for crushers, of a reciprocating feeder; means for supporting the feeder; means for reciprocating the feeder, said feeder having angular side bars and a bottom plate; a detachable plate having side members beveled at their inner ends to extend under the edge of the bottom plate of the feeder so that the detachable plate will be on the same plane as the bottom plate; and means for securing the detachable plate to the side bars of the feeder.

HARRY N. LOWENTHAL.